May 23, 1967     A. L. LASTNIK ETAL     3,320,619

LIGHTWEIGHT BALLISTIC HELMET

Filed June 30, 1965

INVENTORS:
Edward R. Barron
Abraham L. Lastnik

United States Patent Office 3,320,619
Patented May 23, 1967

3,320,619
LIGHTWEIGHT BALLISTIC HELMET
Abraham L. Lastnik, 575 Potter Road, and Edward R. Barron, 20 Ruth Drive, both of Framingham, Mass. 01701
Filed June 30, 1965, Ser. No. 468,656
10 Claims. (Cl. 2—6)

ABSTRACT OF THE DISCLOSURE

A ballistic helmet or armor material formed of three distinct layers, the inner layer comprising a resin-bonded woven fabric laminate, the intermediate layer comprising a needle punched nylon felt, and the outer layer comprising a shatter and penetration resistant material such as a resin-bonded woven nylon fabric laminate or solid polycarbonate sheet, said layers being held together in assembled relationship.

The invention described herein, if patented, may be manufactured and used by or for the Government for governmental purposes without the payment to us of any royalty thereon.

Our invention relates to a novel lightweight, non-metallic, ballistic armor and, more particularly, to a ballistic helmet made of such armor.

In the field of body armor, reliance has traditionally been placed on the use of metals and metal alloys to provide protection against ballistic missiles and fragments. Metallic materials, however, while capable of affording the required degree of protection have certain inherent disadvantages, the most notable among which are the heavy weight burden, inflexibility, thermal and electrical conductivity and lack of buoyancy in water. Studies have been made of non-metallic systems in an attempt to produce a material or combination of materials which are at least equal in protective properties to and avoid one or more of the above disadvantages of metal armor. To the present, the most promising non-metallic armor system has been a laminate of woven fibrous materials, e.g., glass or synthetic fiber fabrics, impregnated lightly (15–25%) with a thermosetting resin to cause adherence of the plies of the fabric in normal use but to permit delamination under the force of a ballistic projectile, the theory being that the energy of the missile or fragment is dissipated in delaminating and stretching the individual plies of fabric.

To date, studies of armor materials have all tended to indicate that the resistance to ballistic penetration is more or less a function of the areal density of the material, areal density being defined as the weight of the material per unit area. Our invention, however, through a novel and unusual combination of materials, has resulted in an armor material that provides greater ballistic protection and resistance than would be expected from its areal density. Specifically, we have found that a combat helmet made of the armor material of this invention is capable of providing the same level of protection against certain ballistic fragments as the standard steel combat helmet and nylon liner combination presently in use at an approximately 30% reduction in weight.

Accordingly, it is among the objects of the present invention to provide a novel armor material combining low weight per unit area with high resistance to penetration by ballistic fragments and missiles.

Another object is to provide a novel non-metallic armor material suitable for use in fabricating combat helmets.

A further object is to provide an armor material that in addition to ballistic protection provides low-level crash and impact protection.

Various other objects and advantages will become apparent from the following detailed description taken in conjunction with the accompanying drawing illustrating one embodiment of our invention:

Figure 1:
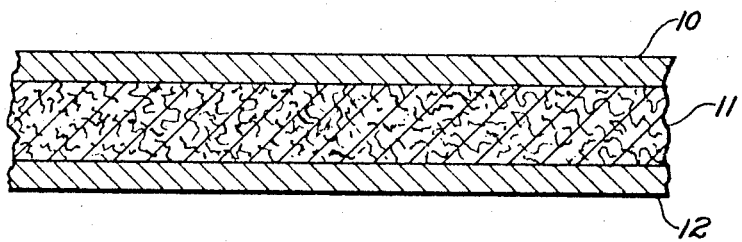
FIGURE 1 is a sectional view of the armor material of our invention.

While the armor material of our invention may be utilized for any article of protective armor it is especially suitable by virtue of its particular properties for use as personnel body armor and, more especially, for use in fabricating ballistic helmets. Referring to the drawing, the armor material is shown to be a composite of three distinct layers of materials, the innermost layer or liner designated as 10, the intermediate layer as 11, and the outer layer ar shell as 12. The composition and arrangement of the inner and intermediate layers has been established as being critical in achieving the desirable ballistic properties of our armor material.

The inner layer 10 consists of a resin-bonded nylon fabric laminate structure. This structure may, for example, be formed of four plies of nylon ballistic cloth which cloth is formed by weaving a high tenacity, continuous filament nylon prepared from hexamethylenediamine and adipic acid or its derivatives and having a melting point of $250°\pm6°$ C. The warp and filling yarns are 1050 denier, multifilament with 3 to 4 turns per inch Z twist and the weave is a 2 by 2 basket weave with two ends weaving as one and two picks weaving as one. The cloth is thoroughly scoured and heat-treated and has a minimum breaking strength in the warp of 900 pounds and in the filling of 825 pounds, and a minimum ultimate elongation of 25 percent in the warp and 20 percent in the filling. Further details relative to this nylon ballistic cloth may be found in Military Specification, MIL-C-12369D(GL), entitled "Cloth, Ballistic, Nylon." The four plies of nylon cloth are coated on each side with a resin solution, such as a catalyzed system of phenol formaldehyde and polyvinyl butyral resins. A suitable catalyzed system contains a mixture of 87 parts by weight of an ethanol solution of polyvinyl butyral (25% solids), 10 parts by weight of phenolic varnish (57% solids), 27 parts by weight of trimethylol phenol (60% solids) and 2.6 parts by weight of phthalic anhydride dissolved in 5 parts by weight of methanol. The resin coated plies are bonded together under heat and pressure to effect a cure of the resin. The resin content of the cured structure varies from 13 to 19 percent by weight of the structure. The areal density of this material is about 9 oz./sq./ft. While four plies of nylon fabric are preferred for most purposes, more or less than four plies may be used wherever greater or lesser protection is desired.

The intermediate layer 11 is composed of a needle-punched nylon felt, which in the present example, weighs about $5.7\pm4$ oz. per square foot and has a thickness of approximately 0.33 inch. The staple nylon fibers used in the fabrication of the felt are made from continuous filament, bright, high tenacity, industrial cord yarn, 6 denier per filament, cut to 3-inch length and crimped. The nylon is prepared from hexamethylene diamine and adipic acid or its derivatives and has a melting point of $250°\pm6°$ C. The staple fibers are processed through a conventional single-cylinder wool card with a double feed box, to make a web of approximately 1⅓ ounces per square yard weight. Cross-laid batts 4 ounces per square yard are then made by lapping a card web three times at an apex angle of approximately 17°. The cross-laid batts are needled with standard "no pick-up" barbed needles (18 x 32 x 3½, RB) at 277 penetrations per square inch per pass and ½ inch penetration. The stripper plate setting is ⅝ inch from the bed on the delivery side and a ¾ inch increase on the feed side. After one batt is passed through the needling, additional batts are then needled on alternating sides thereof until twelve batts have been joined to form a felt approximately ½ inch thick. This felt is condensed and set to a 0.33 inch thickness by a flat bed press using 0.29 inch spacers with platen temperature of 310° F. and a cycle time of approximately 6 minutes. The $V_{50}$ ballistic limit of this material having an areal density of 6 oz. per square foot has been established as being 1000 ft. per second.

The outer layer or shell 12 is formed of a shatter-resistant and penetration-resistant material. For purposes of this invention shatter-resistant is defined as the ability of a material to resist cracking or shattering at any temperature within the range of 75° C. to −65° C. when struck by a 1.5 inch steel ball weighing 8 oz. which is dropped 100 inches onto the specimen. A penetration-resistant material is defined as having a $V_{50}$ of at least 600 ft./sec., $V_{50}$ being the impact velocity at which there is a 50% probability of penetration by a 17 grain, caliber .22 fragment simulator. In the present example we prefer to employ as the outer layer a laminated resin-bonded nylon fabric as described for the inner layer, although other resin-bonded fabrics, such as glass or Dacron fibers, or reinforced plastic materials, or solid thermoplastic materials such as polycarbonate sheets may be used. These materials have an areal density which is about 9 oz. per sq./ft.

The three layers are placed tightly together in the indicated arrangement and held together by any suitable means to form the armor panel. In the case of small panels it will be sufficient to joint the peripheral edges of the inner and outer layers together by heat-sealing or the use of waterproofing adhesives, e.g., neoprene or polyvinyl butyral cements. In larger panels it may be desirable to fix the intermediate layer with respect to the inner and outer layers by means of staples or by the spot application of adhesives which will tack the three layers together at scattered points. It is essential, however, that the inner and outer layers provide a watertight seal or covering for the intermediate layer since the latter will rapidly absorb any water that contacts it and the presence of water in the felt drastically reduces its ballistic protective properties.

Figure 2:
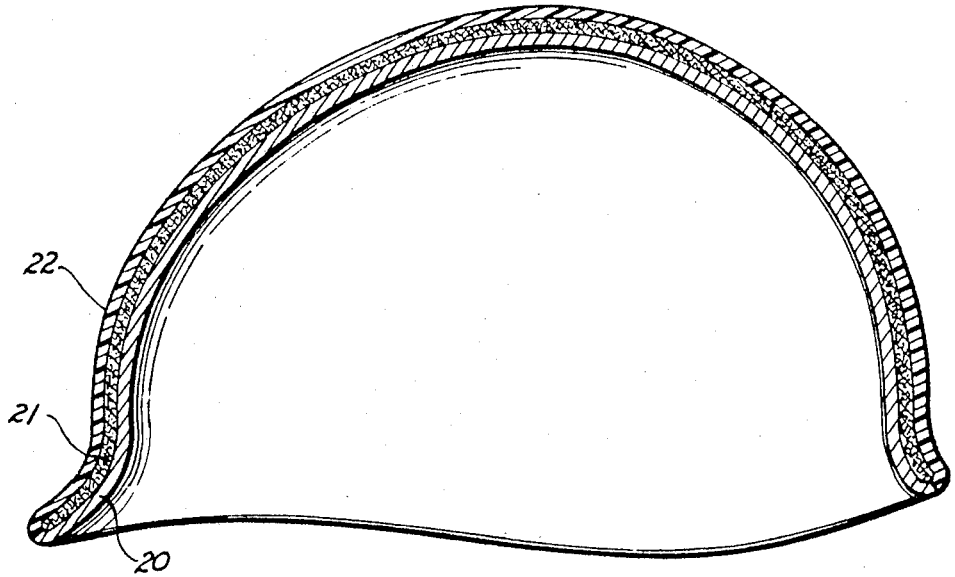
FIGURE 2 is a sectional view of a ballistic helmet according to our invention.

FIGURE 2 illustrates a sectional view of a novel combat helmet having excellent ballistic properties for its weight as well as low level impact and crash protective properties. The inner layer 20 of the helmet is a laminated nylon fabric structure, the same as that described heretofore for the inner layer 10, and has a thickness of 0.097 inch plus or minus 0.015 inch. This layer is molded during the curing step in the shape of a helmet. The construction details and specific requirements of this inner layer are similar to that set forth in detail in Military Specification, MIL-L-41800A entitled "Liner, Soldier's Steel Helmet (Combat)."

The intermediate layer 21 of the helmet is a needle-punched nylon felt, such as that described in connection with the intermediate layer 11 above, and has the same thickness and weight per square foot.

The outer layer or shell 22 is preferably a molded polycarbonate sheet which is approximately 0.06 inch in thickness and weighs approximately 9 oz. per sq./ft. The polycarbonate is of the bis(hydroxyphenyl) alkane type, such as "Lexan," a product of General Electric Co. or "Merlon," a product of Mobay Chemical Co. In addition to the polycarbonate there may also be used those materials described in connection with the outer layer or shell 12.

In fabricating the helmet a suspension system, not shown in the drawing, is secured to the inner surface of the inner layer 20 in the manner disclosed in Military Specification MIL-L-41800A. The nylon felt intermediate layer is formed to the shape of the helmet and then positioned over the inner layer. Polycarbonate resin is molded by means of heat and pressure to the shape desired and is placed over the nylon felt. The three components are so constructed as to fit closely together. The edges of the inner layer and outer layers extend beyond the felt layer and are heat-sealed together.

The areal density of the separate components of our helmet, exclusive of suspension system, is as follows:

| | Oz. per sq./ft. |
|---|---|
| (1) Outer layer | 9 |
| (2) Intermediate layer | 6 |
| (3) Inner liner | 9 |
| Total areal density | 24 |

The areal density of a standard steel combat helmet system, exclusive of suspension system, is as follows:

| | Oz. per sq./ft. |
|---|---|
| (1) Steel shell | 28 |
| (2) Ballistic nylon liner | 9 |
| Total areal density | 37 |

It can be seen that there is a weight saving of 13 oz. per sq./ft. in areal density of our helmet over the present standard helmet system. The present standard steel helmet system and our improved non-metallic helmet provide the same level of protection against shell fragments and secondary missiles but the former weighs 48 oz. whereas the latter weighs but 32 oz.

In addition to ballistic resistant properties, the helmet of our invention unexpectedly provides low level impact and crash protection which properties are not found in the steel combat helmet system. While the precise mechanism responsible for this protection is not known, it is thought that the inner and outer shells serve to spread the load of the impact by resisting deflection and that the felt layer serves to absorb part of the load in compression so that the net result is to greatly reduce the energy transmitted to any point on the head of the wearer.

The invention described in detail in the foregoing specification is susceptible to changes and modifications as may occur to persons skilled in the art without departing from the principle and spirit thereof. The terminology used is for purposes of description and not of limitation, the scope of the invention being defined in the claims.

We claim:
1. A ballistic helmet including in combination:
 (a) an inner shell having the shape of a helmet and formed of a resin-bonded woven fabric laminate,
 (b) an intermediate layer of needle-punched nylon felt superimposed over said inner shell,
 (c) a hard outer covering formed from a shatter- and penetration-resistant material, and means retaining said shell, intermediate layer and outer covering in assembled relationship.
2. A ballistic helmet including in combination:
 (a) an inner shell having the shape of a helmet and molded from a resin-bonded woven nylon fabric laminate,
 (b) an intermediate layer of needle-punched nylon felt superimposed over said inner shell,
 (c) a hard outer covering of a solid polycarbonate material, and
 (d) means retaining said shell, intermediate layer and covering in assembled relationship.
3. A ballistic helmet including in combination:
 (a) an inner shell having the shape of a helmet, formed of a molded resin-bonded woven nylon fabric laminate, having an areal density of 9 oz. per sq./ft.,
 (b) an intermediate layer of needle-punched penetration-resistant nylon felt superimposed over and completely covering said inner shell and having an areal density of 6 oz. per sq./ft.,
 (c) a hard outer covering of a solid polycarbonate sheet and having an areal density of 9 oz. per sq./ft.,

(d) means retaining said inner shell, intermediate layer and outer covering in assembled relationship.

4. A ballistic helmet according to claim 3 wherein said inner shell and outer covering form a watertight covering for said intermediate nylon felt layer.

5. A ballistic armor material including in combination:
   (a) an inner layer composed of a resin-bonded woven fabric laminate,
   (b) an intermediate layer composed of a needle-punched nylon felt,
   (c) an outer layer composed of a penetration and shatter-resistant material,
   (d) means retaining said inner, intermediate and outer layers in assembled relationship.

6. A ballistic armor material including in combination:
   (a) an inner layer composed of a resin-bonded woven nylon fabric laminate,
   (b) an intermediate layer composed of a needle-punched nylon felt,
   (c) an outer layer composed of a resin-bonded woven nylon fabric laminate,
   (d) means retaining said inner, intermediate and outer layers in assembled relationship.

7. A ballistic armor material including in combination:
   (a) an inner layer composed of a resin-bonded woven nylon fabric laminate having an areal density of about 9 oz. per sq./ft.,
   (b) an intermediate layer composed of a needle-punched nylon felt having an areal density of about 6 oz. per sq./ft.,
   (c) an outer layer composed of a resin-bonded woven nylon fabric laminate having an areal density of about 9 oz. per sq./ft., and
   (d) means retaining said inner, intermediate and outer layers in assembled relationship.

8. A ballistic armor material according to claim 7 wherein the exterior surfaces of said inner and outer layers and the peripheral edges of said armor are watertight.

9. A ballistic armor material including in combination:
   (a) an inner layer composed of a resin-bonded woven nylon fabric laminate having an areal density of about 9 oz. per sq./ft.,
   (b) an intermediate layer composed of a needle-punched nylon felt having an areal density of about 6 oz. per sq./ft.,
   (c) an outer layer composed of a penetration- and shatter-resistant solid synthetic resin having an areal density of about 9 oz. per sq./ft.,
   (d) means retaining said inner, intermediate and outer layers in assembled relationship.

10. A ballistic armor according to claim 9 wherein said shatter-resistant synthetic resin is a polycarbonate.

References Cited by the Examiner

UNITED STATES PATENTS

| | | | |
|---|---|---|---|
| 2,766,453 | 10/1956 | Frieder et al. | 2—3 X |
| 3,018,210 | 11/1962 | Frieder et al. | 2—3 X |
| 3,179,553 | 4/1965 | Franklin | 2—2.5 X |

JORDAN FRANKLIN, *Primary Examiner.*

J. R. BOLER, *Assistant Examiner.*